Oct. 11, 1955 L. H. MORIN 2,720,015
CENTER RIDGE SCOOP OF SEPARABLE FASTENER STRINGERS
Filed Aug. 9, 1951 2 Sheets-Sheet 2
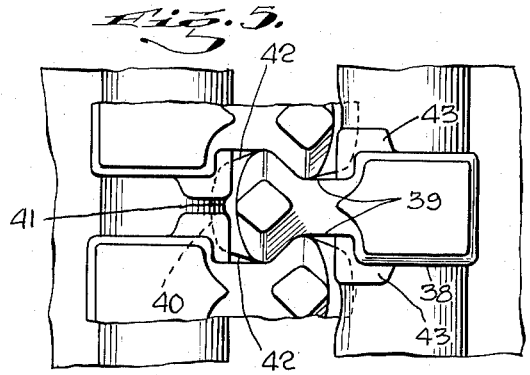
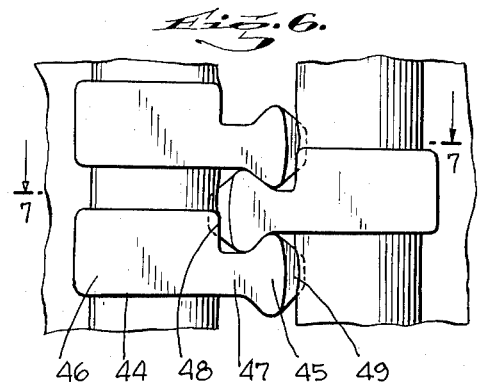
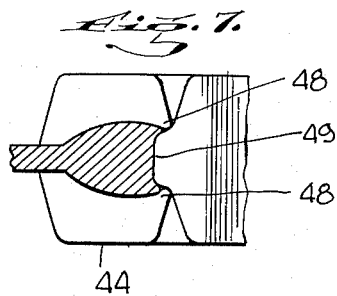
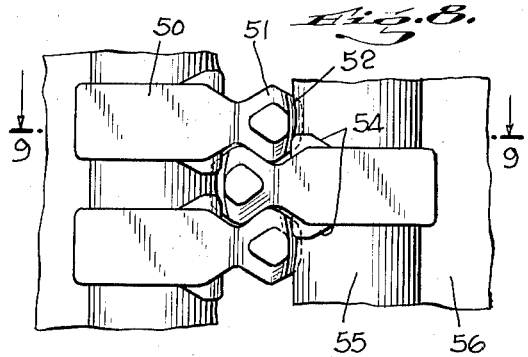
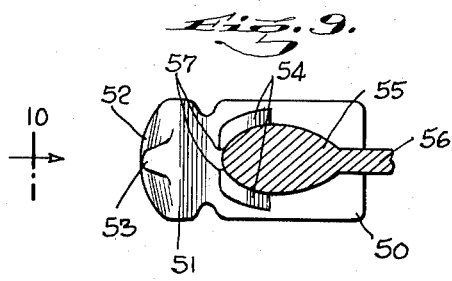
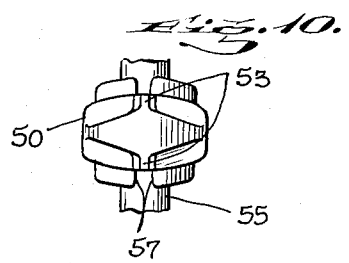
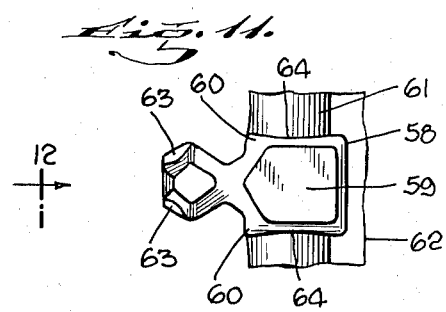
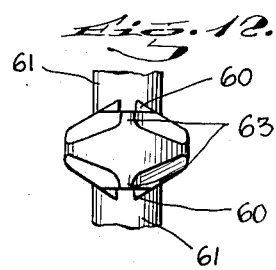
INVENTOR
LOUIS H. MORIN
BY
ATTORNEY

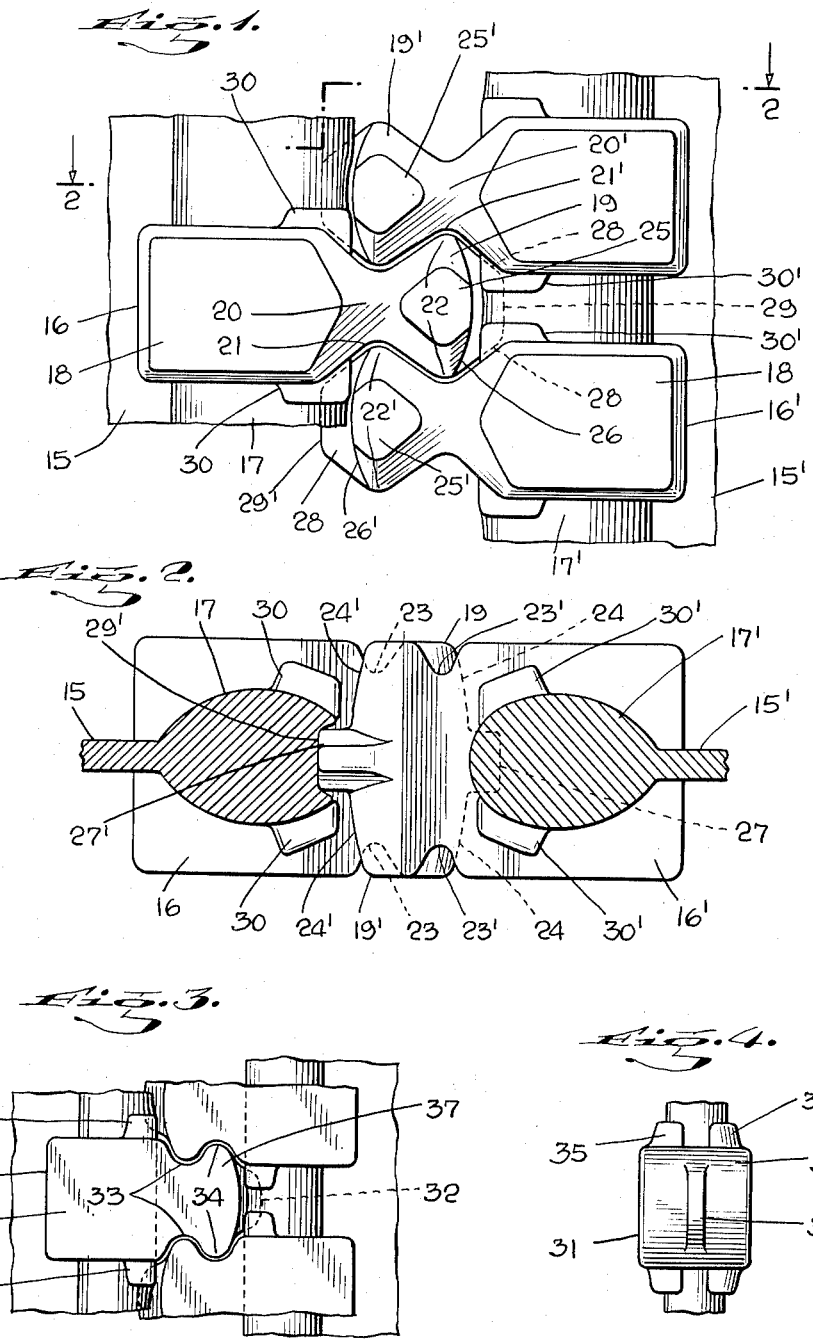

United States Patent Office 2,720,015
Patented Oct. 11, 1955

2,720,015

CENTER RIDGE SCOOP OF SEPARABLE FASTENER STRINGERS

Louis H. Morin, Bronx, N. Y.

Application August 9, 1951, Serial No. 241,033

17 Claims. (Cl. 24—205.13)

This invention relates to separable fastener stringers. More particularly, the invention deals with what I term a center ridge scoop, wherein each scoop has, at its coupling end, an outwardly projecting ridge or key member adapted to be pressed into the bead of an opposed stringer intermediate adjacent scoops of said stringer and between projecting lugs on upper and lower surfaces of the scoops.

Still more particularly, the invention deals with a stringer structure of the character described, employing what might also be termed blunt nosed scoops, wherein the beaded edges of a pair of stringers are maintained in close proximity to each other when the scoops of the stringers are in coupling engagement with each other.

The novel features of the invention will be best understood from the following description, when taken together with the accompanying drawing, in which the separate parts are designated by suitable reference characters in each of the views and, in which:

Fig. 1 is a plan view of a part of two stringers showing one form of scoop structure which I employ.

Fig. 2 is a section substantially on the line 2—2 of Fig. 1.

Fig. 3 is a view similar to Fig. 1, showing a modification.

Fig. 4 is a front edge view of one of the scoops, as seen in Fig. 3.

Fig. 5 is a view similar to Fig. 1 showing another form of construction.

Fig. 6 is a view similar to Fig. 1 showing another form of construction.

Fig. 7 is a partial section substantially on the line 7—7 of Fig. 6.

Fig. 8 is a view similar to Fig. 1 showing another form of scoop structure.

Fig. 9 is a sectional view on the line 9—9 of Fig. 8 showing only one stringer and one scoop.

Fig. 10 is a view looking in the direction of the arrow 10 of Fig. 9.

Fig. 11 is a side view of a single scoop and part of a stringer showing another form of scoop which I employ; and Fig. 12 is a view looking in the direction of the arrow 12 of Fig. 11.

In Figs. 1 and 2 of the drawing, I have shown at 15, 15' parts of two similar stringers in coupled engagement with each other, each stringer having common scoops 16, 16' mounted upon the beaded edges 17, 17' of the stringer tapes.

As each scoop 16, 16' is of the same construction, one of these scoops, the scoop 16, will be specifically described and like structures of the scoop 16' will have the reference characters primed thereon. The scoop 16 comprises a mounting end portion 18 which is disposed upon the bead 17 of the tape 15 and joins a coupling end portion 19 of the blunt nosed-type in a contracted neck portion 20 which is disposed adjacent the edge of the bead 17.

The neck 20 is formed by upper and lower V-shaped female coupling portions 21 adapted to receive the upwardly projecting parts or male coupling portions 22, or 22', of the scoops of a companion stringer in the manner clearly illustrated in establishing the coupling engagement of the scoops to prevent lateral separation. It will also appear from a consideration of Fig. 2 of the drawing that the neck 20 is also defined by grooved or recessed sides, as at 23. It will also appear that the coupling heads of the scoops, which are defined by the projections 22, are rounded, or tapered, as is indicated by the surfaces 24 which extend to relatively small flat sides, as seen at 25. The projections 22 terminate in rounded blunt nosed outer surfaces 26, as will be apparent from a consideration of Fig. 1 of the drawing and, centrally of these surfaces, the coupling heads have outwardly projecting vertically disposed ribs, or ridges 27. Upper and lower surfaces of the ridges are contracted, as indicated at 28, to provide relatively short outer ends 29, which are adapted to press into the stringer beads in the manner clearly indicated at the left of Fig. 2 of the drawing, where the ridge or rib 27' is pressed into the bead 17.

The mounting end portion 18 has upwardly and downwardly projecting pairs of lugs 30 and, when the stringers are coupled together, it will appear that the ribs or ridges are disposed between the lugs of adjacent scoops of an opposed stringer; for example, at the right of Fig. 1, it will appear that the ridge 29 is disposed between the lugs 30' of the two adjacent scoops. This construction keys and retains the scoops of the stringers against transverse separation and it is important to here note that this coupling engagement is maintained at the beaded edge of the stringers, and, in coupling the stringers together, the pressure engagement of the ribs or ridges 29, 29' with the beads 17, 17' will provide what might be termed a tensional engagement between the scoops. It will be apparent, from a consideration of Fig. 2 of the drawing, that the lugs 30, 30' overlie the ridges 29', 29, respectively, when the stringers are coupled together.

In Figs. 3 to 12, inclusive, I have shown other modifications of the scoop structure shown in Fig. 1, all of which operate substantially on the same principle as the scoop structure of Fig. 1 and, for this reason, the brief description of these various forms of construction will be minimized to the extent of defining the structural differences.

In Figs. 3 and 4 of the drawing, a scoop 31 is shown which differs from the scoop 16 in having a rounded rib, or ridge 32, rather than the abruptly bevelled or contracted ridge 29. Further, the recesses 33 forming the female coupling portion of the scoop are rounded, as are also the projections 34, which form the male blunt nosed head. The lugs 35 of the scoop 31 are slightly different in shape and this is largely due to the fact that the mounting end portion 36 of the scoop 31 has side surfaces which are flush with the side surfaces of the coupling end portion 37 of the scoop.

It will also appear from a consideration of Fig. 4 of the drawing that the rib or ridge 32 terminates short of the upper and lower surfaces of the coupling end portion 37. Aside from the foregoing, the structure and method of operation of the scoop, shown in Figs. 3 and 4, will be the same as that shown in Figs. 1 and 2.

In Fig. 5, I have shown at 38 a scoop which differs from the scoop 16 primarily in having substantially parallel flat walls 39 at the base of the neck or female coupling portion of the scoop and the projecting rib or ridge 40 has a slightly rounded outer surface 41 extending into slightly contracted upper and lower surfaces 42. The lugs 43 are very much the same as the lugs 30 of Fig. 1, but otherwise the scoop 38 is substantially of the same general construction as the scoop 16.

In Figs. 6 and 7 of the drawing, I have shown a varied type of scoop 44, wherein the coupling end portion 45 is offset with respect to the mounting end portion 46. In other words, the neck or female part 47 of the coupling end portion extends from what may be termed the lower half of the mounting end portion 46 and the remainder of the mounting end portion above the part 47 has, at its outer end, projecting members 48 which form lugs, generally functioning in a manner similar to the lugs shown in Figs. 1 to 5, inclusive. The lugs 48 are adapted to be disposed at opposite sides of the rib or ridge 49 of a companion scoop in the manner clearly seen in Fig. 7 of the drawing. The ribs or ridges 49 are substantially the same as the ribs or ridges 29 of Fig. 1 of the drawing.

With the construction shown in Figs. 6 and 7, it will appear that the projecting rib or ridge 49 engages the lugs 48 of only one scoop of a companion stringer, in that the lugs 48 are disposed at one side only of the scoop.

In Figs. 8 to 10, inclusive, I have shown a modification of the construction in Figs. 1 and 2, wherein the scoop 50 has a coupling head 51, wherein the rib or ridge 52 is generally of the shape shown in Figs. 1 and 2 as appearing in a side view, but is abruptly rounded, as viewed in plan, as will appear from a consideration of Fig. 9 of the drawing and the rib or ridge 52 has, at its upper and lower portions, bevelled key members 53 which are adapted to engage the lugs 54 of scoops of an opposed stringer.

The lugs 54 extend around the edge of the head 55 of the stringer 56 in the manner clearly illustrated in Fig. 9, so that the key members 53 will fit between the closely adjacent edges 57 of the lugs 54, thus establishing a direct engagement of the key members 53 with the lugs and, at the same time, the rib or ridge 52 imbeds itself in the tape bead 55 as with the other forms of construction shown.

In Figs. 11 and 12, I have shown another form of construction, wherein a scoop 58, generally of the construction shown in Fig. 1, is employed, the mounting end portion 59 being modified to the extent of having upwardly and downwardly projecting, forwardly extending lug portions 60 extending onto the bead 61 of the tape 62 in a manner similar to the lugs 54, so as to closely engage projecting key portions 63 of a scoop of a companion stringer.

The upward extension of the mounting end portion 59 to form the lugs 60 is accentuated by recessed upper and lower surfaces 64, as clearly seen in Fig. 11.

With the several forms of construction shown, it will be apparent that, in addition to providing blunt nosed scoop structures, which facilitate disposing the beads of the stringer tapes in close proximity to each other, the scoops are all of the double action type, that is to say, will facilitate mounting of sliders on the stringers to move in both directions in establishing a coupling engagement, as in other double action scoops of this type and kind. In all forms of construction shown, the coupling end of the scoop has a projecting rib, ridge or element which is adapted to imbed itself in the tape bead between adjacent scoops of an opposed stringer and also to extend between at least one pair of lugs or projections of a scoop of a companion stringer.

One of the distinctive features in the scoop structure disclosed resides in the fact that the normal mounting end portion of the scoop includes coupling elements adapted to cooperate with the projecting rib, ridge or other element of the head of a scoop of a companion stringer, the coupling elements on the mounting end portion being in the form of pairs of lugs disposed at opposite sides of the tape bead to overlap or overlie said coupling ridge or element. This coupling engagement retains the coupled stringers against transverse separation, whereas the coupling heads, engaging the female portions of scoops of a companion stringer, couple the stringers together against lateral or pull-apart separation.

Having fully described my invention, what I claim as new and desire to secure by Letters Patent is:

1. In separable fastener stringers employing elongated stringer tapes having beaded edges and scoops spaced longitudinally of the beaded edges of the tapes, each scoop having a mounting end portion arranged upon the beaded edge of a tape and a coupling end portion projecting beyond the beaded edge of the tape, said coupling portions having coupling heads at the outer ends thereof, inwardly of which are recessed female coupling portions adapted to receive the heads of scoops of a companion stringer, said heads having, centrally of the outer surfaces thereof, coupling ridges adapted to extend into the bead of the tape of a companion stringer to provide a pressure engagement between coupled stringers, and the mounting end portion of each scoop having, at opposite sides of the bead, coupling lugs adapted to overlie the ridge of a scoop of a companion stringer in coupling stringers together against transverse separation.

2. In separable fastener stringers employing elongated stringer tapes having beaded edges and scoops spaced longitudinally of the beaded edges of the tapes, each scoop having a mounting end portion arranged upon the beaded edge of a tape and a coupling end portion projecting beyond the beaded edge of the tape, said coupling portions having coupling heads at the outer ends thereof, inwardly of which are recessed female coupling portions adapted to receive the heads of scoops of a companion stringer, said heads having, centrally of the outer surfaces thereof, coupling ridges adapted to extend into the bead of the tape of a companion stringer, the mounting end portion of each scoop having, at opposite sides of the bead, coupling lugs adapted to overlie the ridge of a scoop of a companion stringer in coupling stringers together against transverse separation, and the ridge of each scoop extending from upper and lower surfaces of the coupling head of the scoop.

3. In separable fastener stringers employing elongated stringer tapes having beaded edges and scoops spaced longitudinally of the beaded edges of the tapes, each scoop having a mounting end portion arranged upon the beaded edge of a tape and a coupling end portion projecting beyond the beaded edge of the tape, said coupling portions having coupling heads at the outer ends thereof, inwardly of which are recessed female coupling portions adapted to receive the heads of scoops of a companion stringer, said heads having, centrally of the outer surfaces thereof, coupling ridges adapted to extend into the bead of the tape of a companion stringer, the mounting end portion of each scoop having, at opposite sides of the bead, coupling lugs adapted to overlie the ridge of a scoop of a companion stringer in coupling stringers together against transverse separation, substantially the entire length of each said lug, when the scoop is viewed in side elevation, overlapping the bead, the ridges of the scoops of a pair of coupled stringers lying in the plane of both tapes of said coupled stringers, and the scoops on each of said coupled stringers having a pressure engagement with the opposite tape bead by virtue of said extension of the ridges into the bead.

4. In separable fastener stringers employing elongated stringer tapes having beaded edges and scoops spaced longitudinally of the beaded edges of the tapes, each scoop having a mounting end portion arranged upon the beaded edge of a tape and a coupling end portion projecting beyond the beaded edge of the tape, said coupling portions having coupling heads at the outer ends thereof, inwardly of which are recessed female coupling portions adapted to receive the head of scoops of a companion stringer, said heads having, centrally of the outer surfaces thereof, coupling ridges adapted to extend into the bead of the tape of a companion stringer, the ridges of the scoops of each stringer lying in the plane of the stringer tape, the mounting end portion of each scoop having, at opposite sides of the bead, coupling lugs adapted to overlie the ridge of a scoop of a companion stringer in coupling stringers together against transverse separation, and said lugs having a curvature conforming to the curvature of the bead.

5. In separable fastener stringers employing elongated stringer tapes having beaded edges and scoops spaced longitudinally of the beaded edges of the tapes, each scoop having a mounting end portion arranged upon the beaded edge of a tape and a coupling end portion projecting beyond the beaded edge of the tape, said coupling portions having coupling heads at the outer ends thereof, inwardly of which are recessed female coupling portions adapted to receive the heads of scoops of a companion stringer, said heads having, centrally of the outer surfaces thereof, coupling ridges adapted to extend into the bead of the tape of a companion stringer, the mounting end portion of each scoop having, at opposite sides of the bead, coupling lugs adapted to overlie the ridge of a scoop of a companion stringer in coupling stringers together against transverse separation, said lugs having a curvature conforming to the curvature of the bead, substantially the entire length of each said lug, when the scoop is viewed in side elevation, overlapping the bead, and said lugs having edge portions disposed at the outer edge of the tape bead.

6. In separable fastener stringers employing elongated stringer tapes having beaded edges and scoops spaced longitudinally of the beaded edges of the tapes, each scoop having a mounting end portion arranged upon the beaded edge of a tape and a coupling end portion projecting beyond the beaded edge of the tape, said coupling portions having coupling heads at the outer ends thereof, inwardly of which are recessed female coupling portions adapted to receive the heads of scoops of a companion stringer, said heads having, centrally of the outer surfaces thereof, coupling ridges adapted to extend into the bead of the tape of a companion stringer, the mounting end portion of each scoop having, at opposite sides of the bead, coupling lugs adapted to overlie the ridge of a scoop of a companion stringer in coupling stringers together against transverse separation, said lugs having edge portions disposed at the outer edge of the tape bead, and the coupling end portion being offset with respect to said mounting end portion.

7. In separable fastener stringers employing elongated stringer tapes having beaded edges and scoops spaced longitudinally of the beaded edges of the tapes, each scoop having a mounting end portion arranged upon the beaded edge of a tape and a coupling end portion projecting beyond the beaded edge of the tape, said coupling portions having coupling heads at the outer ends thereof, inwardly of which are recessed female coupling portions adapted to receive the heads of scoops of a companion stringer, said heads having, centrally of the outer surfaces thereof, coupling ridges adapted to extend into the bead of the tape of a companion stringer, the mounting end portion of each scoop having, at opposite sides of the bead, coupling lugs adapted to overlie the ridge of a scoop of a companion stringer in coupling stringers together against transverse separation, and said lugs being arranged in pairs projecting at upper and lower surfaces of the mounting end portion and also extending above upper and lower surfaces of the coupling heads.

8. In separable fastener stringers employing elongated stringer tapes having beaded edges and scoops spaced longitudinally of the beaded edges of the tapes, each scoop having a mounting end portion arranged upon the beaded edge of a tape and a coupling end portion projecting beyond the beaded edge of the tape, said coupling portions having coupling heads at the outer ends thereof, inwardly of which are recessed female coupling portions adapted to receive the heads of scoops of a companion stringer, said heads having, centrally of the outer surfaces thereof, coupling ridges adapted to extend into the bead of the tape of a companion stringer, the mounting end portion of each scoop having, at opposite sides of the bead, coupling lugs adapted to overlie the ridge of a scoop of a companion stringer in coupling stringers together against transverse separation, substantially the entire length of each said lug, when the scoop is viewed in side elevation, overlapping the bead, said lugs being arranged in pairs projecting at upper and lower surfaces of the mounting end portion and also extending above upper and lower surfaces of the coupling heads, said lugs having closely spaced ends disposed outwardly of the edge of the tape bead, and the scoops of each of a pair of coupled stringers having a pressure engagement with the opposite tape bead by virtue of said extension of the ridges into the bead.

9. A scoop for separable fastener stringers of the character described, said scoop comprising a mounting end portion adapted to be arranged upon the beaded edge of a stringer tape, a coupling end portion adapted to project beyond the edge of said tape bead, the coupling end portion having coupling parts engageable with a scoop of an opposed stringer for preventing pull apart separation of the stringers, an outwardly extending projection on the nose of said coupling end portion, a recessed portion on said mounting end portion through which said tape bead is exposed, and said projection being engageable with the recessed portion, and with the tape bead exposed therethrough, of a scoop of an opposed stringer for preventing lateral separation of the stringers.

10. A scoop for separable fastener stringers of the character described, said scoop comprising a mounting end portion adapted to be arranged upon the beaded edge of a stringer tape, a coupling end portion adapted to project beyond the edge of a tape bead, the coupling end portion having an outer head and an inner recessed female coupling portion, said head having an outwardly projecting ridge, the mounting end portion having a pair of coupling lugs at opposite sides of the edge portion of a tape bead and adapted to receive between them the ridge of a scoop of a companion stringer, said ridge, when a pair of said stringers are coupled together, engaging the tape bead of the opposite stringer, and the coupling end portion being offset with respect to the mounting end portion.

11. A separable fastener stringer of the character described, comprising a pair of stringer tapes having scoops spaced longitudinally of adjacent edges of the tapes, each scoop having a coupling end portion and a mounting end portion, said coupling end portion having male and female coupling parts for retaining coupled stringers against pull apart separation, coupling lugs on the mounting end portion of each scoop, means on the male coupling part of each scoop for engaging the coupling lugs of a scoop of a companion stringer for retaining coupled stringers against transverse separation with respect to each other, and said means of each scoop of one stringer having a pressure engagement with the tape of a companion stringer intermediate spaced scoops thereon.

12. In separable fastener stringers having scoops spaced longitudinally thereof, each scoop having a blunt nosed coupling end portion for coupling a pair of stringers so that adjacent edges of the stringers are in close proximity to each other, said coupling end portion having male and female couplings retaining the stringers against pull apart separation, an outwardly extending projection on the nose of said coupling end portion, and a recessed portion on each scoop inwardly of said projection and adapted to be engaged by the projection of an opposed scoop to retain coupled stringers against transverse separation, said projection of the opposed scoop extending through said recessed portion to engage the tape bead inwardly of the recessed portion.

13. A separable fastener stringer comprising a beaded tape having scoops spaced longitudinally of one edge thereof, each scoop comprising a mounting end portion and a coupling end portion, said coupling end portion having coupling parts egageable with a scoop of an opposed stringer for preventing pull-apart separation of the stringers, an outwardly extending projection on the nose of said coupling end portion, a pair of spaced lugs extending outwardly from one side of the mounting end portion and another pair of spaced lugs extending outwardly from the opposite side of said mounting end portion, said lugs being disposed inwardly of the outer edge of the bead of the uncoupled stringer, said projection being engageable with the spaced lugs of a pair of adjacent scoops of an opposed stringer for preventing transverse separation of the stringers.

14. A separable fastener stringer comprising a beaded tape having scoops spaced longitudinally of one edge thereof, each scoop comprising a mounting end portion and a coupling end portion, a neck portion inwardly of the coupling end portion having substantially parallel upper and lower walls, said coupling end portion having coupling parts engageable with a scoop of an opposed stringer for preventing pull-apart separation of the stringers, an outwardly extending projection on the nose of said coupling end portion, said mounting end portion having a recessed portion through which the tape bead is exposed, said projection being engageable with the recessed portion, and with the tape bead exposed therethrough, of a scoop of an opposed stringer for preventing transverse separation of the stringers.

15. A separable fastener stringer comprising a beaded tape having scoops spaced longitudinally of one edge thereof, each scoop comprising a mounting end portion and a coupling end portion, a neck portion inwardly of the coupling end portion having substantially parallel upper and lower walls, said coupling end portion having coupling parts engageable with a scoop of an opposed stringer for preventing pull-apart separation of the stringers, an outwardly extending projection on the nose of said coupling end portion, said coupling end portion being offset to one side of the scoop depthwise thereof, said mounting end portion on the opposite side of the scoop having a recessed portion through which the tape bead is exposed, said recessed portion also opening through said opposite side of the mounting end portion, said projection being engageable with the recessed portion, and with the tape bead exposed therethrough, of a scoop of an opposed stringer for preventing transverse separation of the stringers.

16. A separable fastener stringer comprising a beaded tape having scoops spaced longitudinally of one edge thereof, each scoop comprising a mounting end portion and a coupling end portion, said coupling end portion having coupling parts engageable with a scoop of an opposed stringer for preventing pull-apart separation of the stringers, an outwardly extending projection on the nose of said coupling end portion, said projection being tapered to opposite sides thereof and terminating in upper and lower key members, a pair of spaced lugs extending outwardly from one side of the mounting end portion and another pair of spaced lugs extending outwardly from the opposite side of said mounting end portion, said projection being engageable with the tape bead of an opposed stringer with said key members engaging the spaced lugs of a pair of adjacent scoops of said opposed stringer for preventing transverse separation of the stringers.

17. A separable fastener stringer comprising a beaded tape having scoops spaced longitudinally of one edge thereof, each scoop comprising a mounting end portion and a coupling end portion, said coupling end portion having coupling parts engageable with a scoop of an opposed stringer for preventing pull-apart separation of the stringers, upper and lower keying elements on the outer portion of said coupling end portion, said mounting end portion having recessed portions on upper and lower sides thereof through which the tape bead is exposed, said keying elements being engageable with the recessed portions, and with the tape bead exposed therein, of a pair of adjacent scoops of an opposed stringer for preventing transverse separation of the stringers.

References Cited in the file of this patent

UNITED STATES PATENTS

| | | |
|---|---|---|
| 2,087,456 | Sundback | July 20, 1937 |
| 2,219,657 | Morin | Oct. 29, 1940 |
| 2,251,078 | Stein | July 29, 1941 |
| 2,331,618 | Morin | Oct. 12, 1943 |
| 2,371,591 | Cizek | Mar. 13, 1945 |
| 2,525,284 | Camp | Oct. 10, 1950 |